July 23, 1963  N. J. APPLETON  3,098,388
BAROMETRIC PRESSURE TRANSDUCER
Filed April 21, 1960  6 Sheets-Sheet 1

NORMAN J. APPLETON
INVENTOR.

BY Andrew L. Bain
George B. Oujero
ATTORNEYS

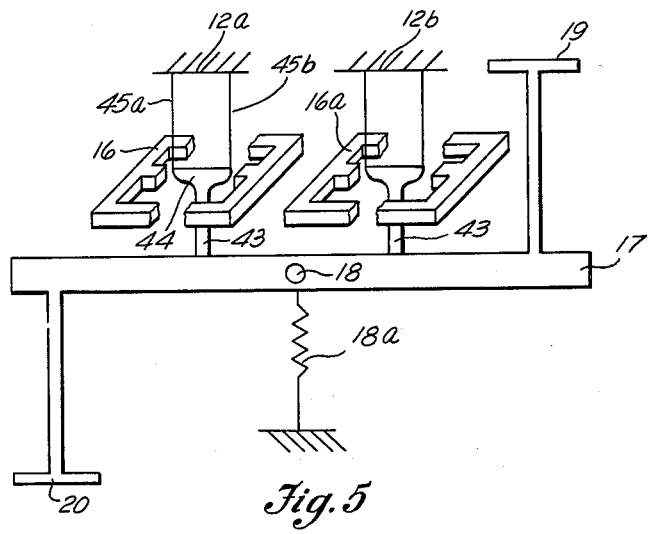
Fig. 5
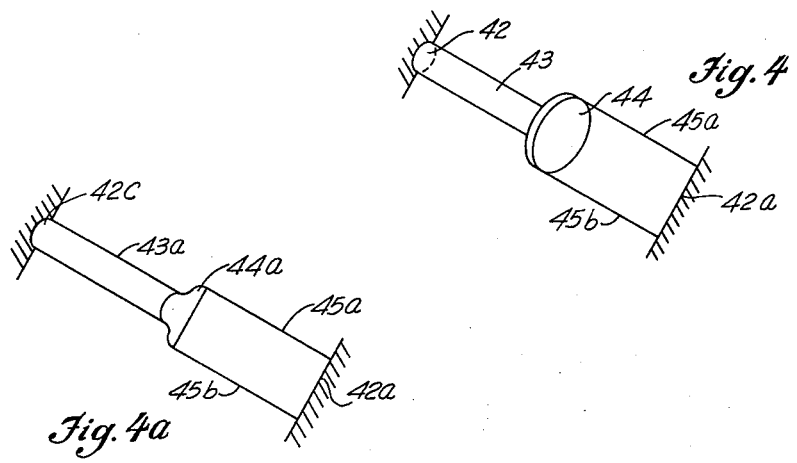
Fig. 4
Fig. 4a

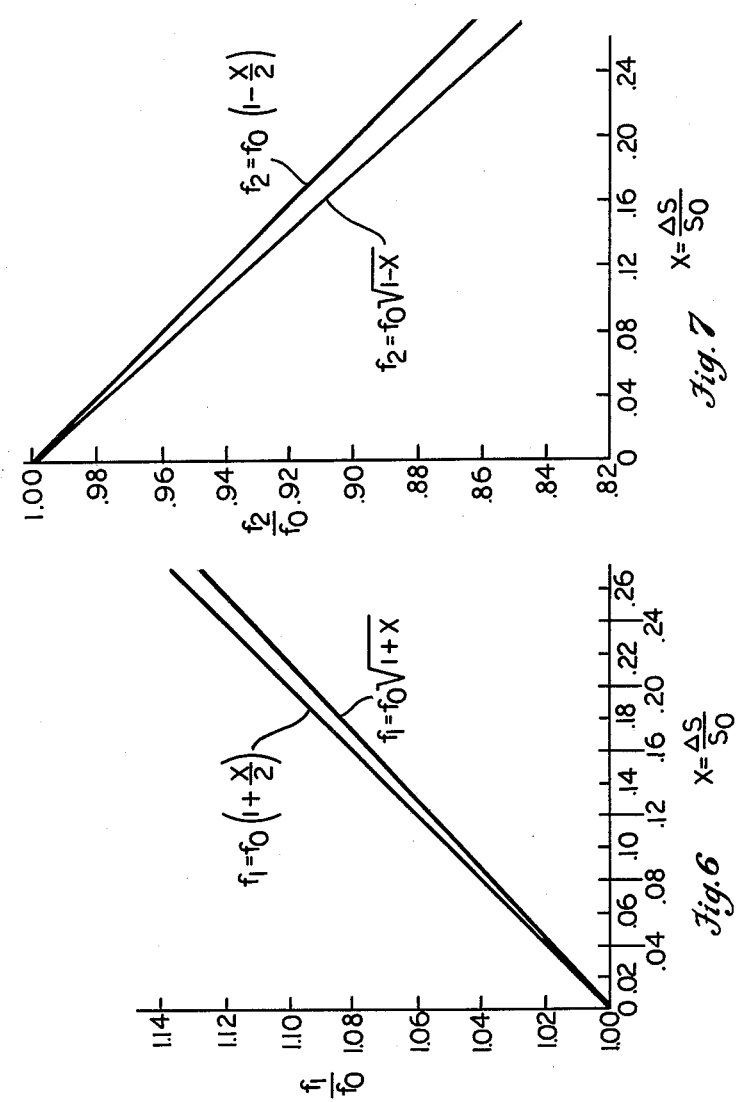

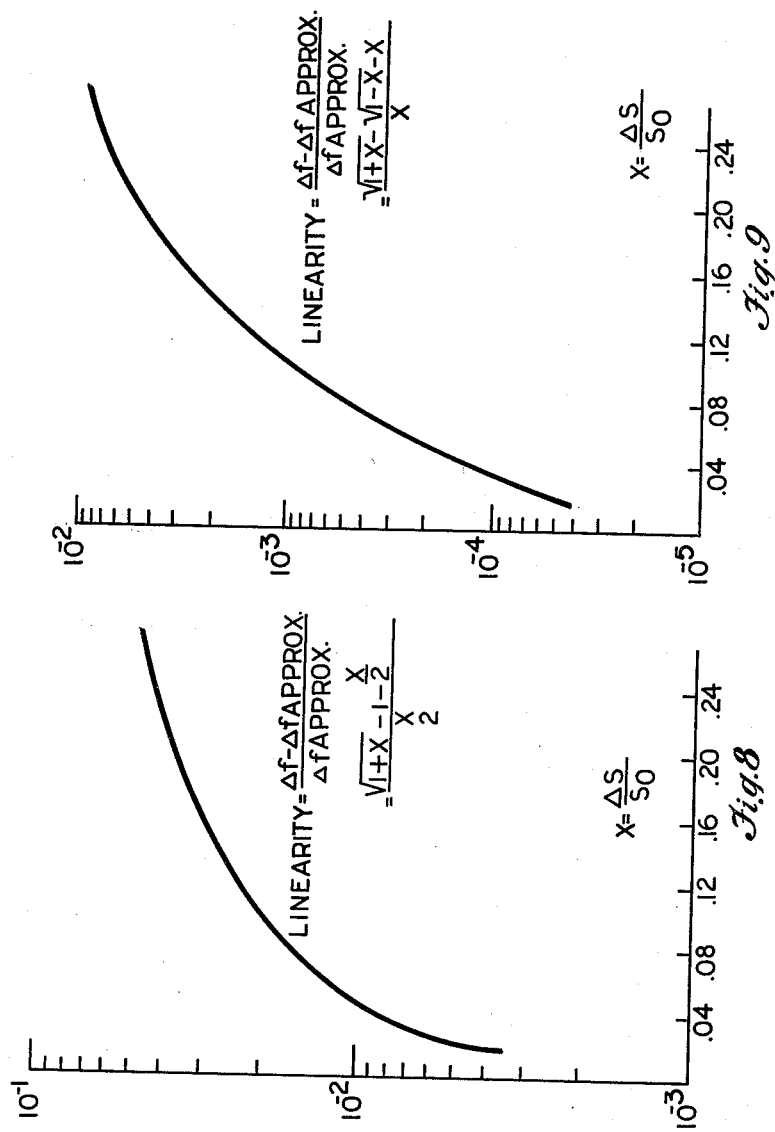

United States Patent Office 3,098,388
Patented July 23, 1963

3,098,388
BAROMETRIC PRESSURE TRANSDUCER
Norman J. Appleton, Plainview, N.Y., assignor to General Precision, Inc., Little Falls, N.J., a corporation of Delaware
Filed Apr. 21, 1960, Ser. No. 23,708
10 Claims. (Cl. 73—384)

The present invention relates to instruments operated by barometric pressure or depending upon barometric pressure for certain functions, and more particular to a barometric pressure transducer useful in altimeters.

It is well known that the resonant frequency of a string under tension is obtained by the formula $f=\sqrt{T/4mL}$, where T is the tension, $m$ is the mass of the string, and L is the length of the string. If an altimeter is constructed, based upon the principle of a vibrating string, the string is placed in a vacuum container and placed under a fixed bias tension; the vacuum container can be so constructed that the incremental tension on the string will vary with the atmospheric pressure on the string, i.e., the vibrating frequency will vary with the altitude. The string can be kept vibrating by a sustained feedback, very much like a tuning fork oscillator. By comparing the string frequency with known reference frequencies for given altitudes, it is possible to obtain a rough altitude reading. A more precise reading is possible by apportioning the difference between the string frequency and the nearest known frequency for a given altitude below the altitude of the string frequency and the known frequency for the next given altitude.

The instrument just described suffers from several defects. First, according to the formula for the string vibrating frequency, the tension, or atmospheric pressure variations will cause the string frequency to vary not in proportion to the tension at a given altitude, but in proportion to the square root of the tension. This makes it difficult to apportion any difference between two known frequencies. Furthermore, an almost perfect performance is required of the string. The string must have an extremely high Q, indicating very low hysteresis losses.

Although many attempts were made to overcome the foregoing difficulties and other difficulties, none, as far as I am aware was entirely successful when carried into practice in the construction of scientific devices and instruments depending on barometric pressure.

It has now been discovered that scientific instruments, e.g., an altimeter can be constructed based upon the principles of a vibrating element which will give highly accurate results.

It is an object of the present invention to provide a barometric pressure transducer.

It is another object of the present invention to provide a precision altimeter.

Still another object of the present invention is to provide an altimeter which is useful at high and low altitudes.

The invention also contemplates a barometric pressure transducer wherein the elements providing the barometric information are in push-pull relationship, balancing out or compensating many errors inherent in the system.

It is also the purpose of the invention to provide means for converting the frequency output of vibrating elements into a readable display in terms of altitude without loss of accuracy.

Among the further objects of the present invention is the provision of an altimeter which will give essentially a digital output.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which:

FIGURE 2 is a schematic illustration of the invention herein contemplated as applied to an altimeter;

FIGURE 4a shows still another type of vibrating element constructed along the principles of construction of the vibrating element illustrated in FIGURE 4;

FIGURE 5 shows a barometric pressure transducer similar to the one depicted in a portion of FIGURE 2, but having the vibrating elements of the kind shown in FIGURE 4;

FIGURE 6 is a plot of a graph showing the linearity for one string of a two string transducer;

FIGURE 7 is a graph similar to that shown in FIGURE 6, but showing the linearity for the other string of a two string transducer.

FIGURE 8 is a plot of the linearity for a single string transducer;

FIGURE 9 is a graph showing the linearity for a double string transducer; and

Figure 1:
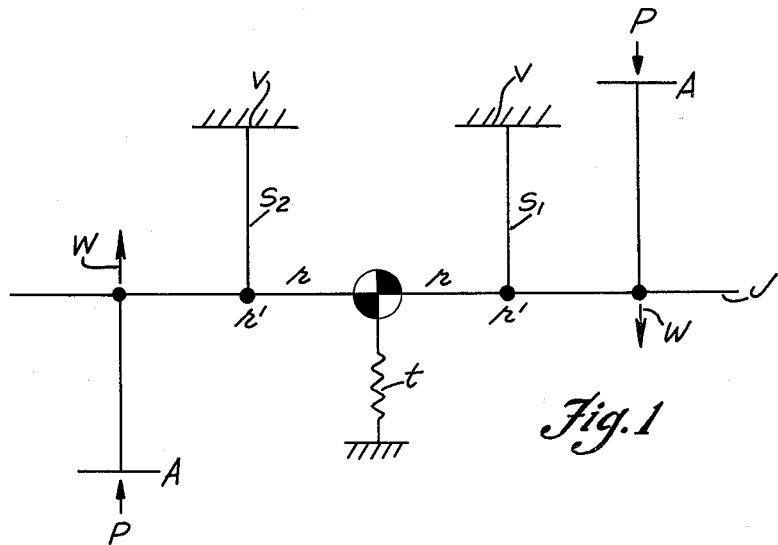
FIGURE 1 is a schematic illustration of the fundamental scientific principles involved in the invention herein contemplated.

Before going into a detailed explanation of the components shown in FIGURES 2 to 5, it is first necessary to visualize the theoretical principles involved as depicted in FIGURE 1. The two strings $S_1$ and $S_2$ are disposed at opposed ends of a lever J of the first class and firmly fastened to a wall V. At the midpoint of lever J is a spring $t$ exerting tension on the two strings. Acting on opposed sides of the lever are loads W. These loads are identical on both sides of the lever and equidistant from the virtual fulcrum. Thus, loads W form a couple having a resultant vertical force of zero for the purpose of the present invention. Furthermore, lever J is relatively fixed and merely senses the moment of the forces about the fulcrum. The result is that not only are the two strings $S_1$ and $S_2$ identical, but notwithstanding the forces acting on the strings, the length of the strings remains relatively stable so that for the present purpose, the length of string $S_1$ will be equal to that of string $S_2$ and the error in the difference in lengths may be disregarded.

As already stated, the resonant frequency of a string is obtained by the formula $$f=\sqrt{T\times\frac{1}{4mL}}$$

where
T is the tension in pounds
$m$ is the mass in pounds×seconds squared divided by inches (weight/gravity)
L is the length of the string in inches
but
$$m=pA_sL$$
where
$p$ (the Greek letter rho is the mass density $$\left(\frac{\text{pounds}\times\text{Sec.}^2}{\text{inches}^4}\right)$$

$A_s$ is the cross sectional area of the string in inches squared

L is the length of the string in inches

Since we are disregarding any change in the length L of the string, the factor $\frac{1}{4}mL$ may for some purposes be treated as a constant $k$. Disregarding the load W in FIGURE 1, since both strings $S_1$ and $S_2$ are identical, the frequency of both strings acted upon by spring $t$ is the same. This initial frequency is termed herein the fundamental frequency $f_0$. The tension is equal to the stress multiplied by the cross sectional area, or $$T = S_0 A_s$$

where $S_0$ is the stress on strings $S_1$ and $S_2$ at the fundamental frequency $f_0$ $A_s$ is as stated above the cross sectional area of the string in inches squared and $DT = DSA_s$ DS being the change in stress caused by any change in tension DT From the foregoing fundamentals $$f_0 = \sqrt{kT}$$

If the lever J is acted upon by loads W, changing the tension on strings $S_1$ and $S_2$ $$f_{s_1} = \sqrt{k(T_s + DT)} \text{ and } f_{s_2} = \sqrt{k(T_s - DT)}$$

Substituting $\frac{1}{4}mL$ for $k$ and concentrating on $f_{s_1}$ $$f_{s_1} = \sqrt{\frac{1}{4mL}(T_s + DT)}$$

but as already stated $$m = pA_sL; \quad T = S_0A_s; \text{ and } DT = DSA_s$$

therefore $$f_{s_1} = \sqrt{\frac{1}{4 \times pA_sL \times L}(S_0A_s + DSA_s)}$$

by simplication we get $$f_{s_1} = \frac{1}{2L}\sqrt{\frac{1}{p}(S_0 + DS)}$$

but $$f_0 = \sqrt{kT} = \sqrt{\frac{1}{4mL} \times T} = \sqrt{\frac{1}{4pA_sL^2} \times T} = f_0 = \frac{1}{2L}\sqrt{\frac{T}{pA_s}}$$

$$= \frac{1}{2L}\sqrt{\frac{S_0A_s}{pA_s}} = f_0 = \frac{1}{2L}\sqrt{\frac{S_0}{p}}$$

$$\frac{1}{L} = 2f_0\sqrt{\frac{p}{S_0}} \text{ and } L = \frac{1}{2f_0}\sqrt{\frac{S_0}{p}}$$

Therefore $$f_{s_1} = \frac{1}{2L}\sqrt{\frac{1}{p}(S_0 + DS)}$$

$$= \frac{1}{2}\left(2f_0\sqrt{\frac{p}{S_0}}\right) \times \sqrt{\frac{1}{p}(S_0 + DS)}$$

$$= f_0\sqrt{\frac{S_0 + DS}{S_0}}$$

$$= f_0\sqrt{1 + \frac{DS}{S_0}}$$

In the same way $$f_{s_2} = f_0\sqrt{1 - \frac{DS}{S_0}}$$

If we let $$x = \frac{DS}{S_0}$$

Since $$f_{s_1} = f_0 + Df_1 \text{ and } f_{s_2} = f_0 - Df_2$$

$$Df_{s_1} = f_{s_1} - f_0 = (f_0\sqrt{1+x}) - f_0$$

$$= f_0(\sqrt{1+x} - 1)$$

$$Df_{s_2} = f_0(1 - \sqrt{1-x})$$

$$Df = Df_{s_1} + Df_{s_2} = f_0(\sqrt{1+x} - \sqrt{1-x})$$

We define

Error = (Exact frequency − approximate frequency)

and since $$(f_{s_1})^2 = (f_0 + Df_{s_1})^2 = k(T_s + DT)$$

and $$(f_0)^2 = (kT_s)$$

therefore $$(f_{s_1})^2 = (f_0)^2 + 2f_0Df_{s_1} + (Df_{s_1})^2$$

$$= kT_s + 2f_0Df_{s_1} + (Df_{s_1})^2 = kT_s + kDT$$

and $$2f_0Df_1 + (Df_{s_1})^2 = kDT$$

The approximate frequency is obtained by neglecting $(Df_{s_1})^2$ or $$Df = \frac{k}{2f_0}DT\frac{k}{2f_0}DSA_s$$

substituting for $k$ and $$\frac{1}{L^2}$$

yields $$Df_1 = \frac{x}{2}f_0$$

and $$f_1 \text{ is approximately} = f_0\left(1 + \frac{x}{2}\right)$$

$$f_2 \text{ is approximately} = f_0\left(1 - \frac{x}{2}\right)$$

These equations are plotted in dimensionless coordinates in FIGURES 5 and 6, and the actual error; incurred as a function of $x(DS/S_0)$; is the difference in ordinate of the two curves. The linearity would be this difference divided by the ordinate to the linear function. The linearity can be found for a single string as $$Df_{s_1} = f_{s_1} - f_0 = f_0(\sqrt{1+x} - 1)$$

The linearized $$Df_1 = \frac{x}{2}f_0$$

Therefore the $$\text{Error} = f_0\left[(\sqrt{1+x} - 1) - \frac{x}{2}\right]$$

and $$\text{Linearity} = \frac{\text{Error}}{\text{Approx. value}} = \frac{\sqrt{1+x} - 1 - \frac{x}{2}}{\frac{x}{2}}$$

The linearity for the double-string transducer can be found in a similar manner:

$$Df = Df_1 + Df_2 = f_0(\sqrt{1+x} - \sqrt{1-x})$$

The Linearized $$Df = f_0\left[\frac{x}{2} - \left(\frac{-x}{2}\right)\right] = f_0x$$

$$\text{Error} = f_0[(\sqrt{1+x} - \sqrt{1-x}) - x]$$

and $$\text{Linearity} = \frac{\text{Error}}{\text{Approx. value}} = \frac{\sqrt{1+x} - \sqrt{1-x} - x}{x}$$

Curves showing the variation of the linearity with $x$ are shown for both a single string and the double string transducer in FIGURES 8 and 9.

By continuing the mathematical analysis of the device depicted in FIGURE 1, it can be shown that the linearity for a double element system is twice the square of that for a single string system. However, linearity for this particular instrument is not the sole consideration. As explained earlier, if the device is used as an altimeter, altitudes are read by comparing the transducer frequency with known frequencies. The linearity of a double stringed instrument is more than sufficient for the purpose of the present invention.

The important feature of the device depicted in FIGURE 1 is the fact that the vibrating strings are perfect in push pull relationship. As previously stated, it is essential, in the operation of a device of this kind that the strings have a high Q, i.e., there be little loss due to hysteresis. In addition to these problems, there are a multitude of other factors which each taken individually may be minutely small, acting on the system causing errors. It has been found by practical experience however, that these minute error causing factors tend to cancel out when the push-pull arrangement depicted in FIGURE 1 is used, and a much greater accuracy results.

Not only are error causing factors cancelled out by the described construction, but the effects of acceleration along the sensitive axis is eliminated. This is very important since the heart of this transducer can be used to sense small changes in acceleration that might be transmitted to it by the inertial forces of any of the masses. Freedom from acceleration effects is obtained by summing the moments about the pivot point. All terms involving acceleration along the sensitive axis drop out. Another factor which tends to cancel out is the effect of temperature change. The thermal coefficient of expansion for most metals is somewhere of the order of $10^{-5}$ per ° F. It turns out that the error in frequency change due to temperature is $10^{-3}\%$ per degree F. The error caused by a change in temperature for a single string unit is considerably greater.

Based upon the foregoing brief explanation, the invention in its broader aspects contemplates; a housing; a pair of identical vibrating elements at opposed ends of said housing, one end of said elements being affixed thereto; an oscillatory feedback circuit associated with each vibrating element to keep it vibrating at its resonant frequency; a lever of the first class disposed between said elements, affixed thereto and preferably extending beyond said elements; tension means, acting on the arms of said lever, tending to load said vibrating elements equally balancing said two elements creating a virtual fulcrum of said midpoint; an atmosphere pressure area loading each lever arm on opposed sides thereof disposed so as to form a pivotal couple about said virtual fulcrum, each area being equal so that the two forces formed by said couple taken together are equal in magnitude and equidistant from said midpoint; and a vacuum chamber associated with each pressure area. If the device is to be used as an altimeter, there is also required a mixer-filter; into which the vibrating frequency of each element is fed, adapted to provide the difference between the frequencies of said elements; a selector, containing a plurality of reference frequencies corresponding to separate altitude heights, adapted to match the output frequency from the mixer-filter with the nearest of the selector freqeuncies, preferably the nearest lower selector frequency to indicate altitude range, and an analog circuit adapted to convert frequency into an electrical quantity so as to apportion any difference between the matched frequencies as a fractional altitude ready so as to provide an altitude reading intermediate the altitude for the matched reference frequency and the next higher reference frequency.

In accordance with one concept, as shown in FIGURE 2, the invention herein contemplated is particularly useful as an altimeter. Generally, such an altimeter comprises a transducer section or vibrating element section 10 and an electronic section 11. The vibrating element section is in a vacuum housing 12 not shown, and comprises a pair of vibrating strings 13 and 14, preferably made of berillium copper alloy of the order of some two percent Be, and the balance substantially Cu. These strings vibrate in magnetic fields 15 and 15a formed by permanent magnets 16 and 16a. The strings are firmly affixed to housing 12 at opposed places in said housing, i.e., 12a and 12b. The other end of said strings is affixed to a substantially axially rigid lever 17. The virtual fulcrum 18 of said lever is located at the midpoint between said strings, making lever 17 a lever of the first class. At the virtual fulcrum the lever 17 is kept under tension by a spring 18a. On opposed sides of lever 17 are atmosphere pressure area or pistons 19 and 20 which act on lever 17 at points 21 and 22, equidistant from fulcrum 18, i.e., lever arm 17a is equal to lever arm 17b. Since the atmosphere pressure areas 19 and 20 are located at opposed sides of the lever, the force exerted by said areas which will be at the same atmospheric pressure, will of course be equal, and form a couple. Thus, the resultant vertical force will be effectively zero for the purpose of the present invention. However, a moment will be created about the pivot on the lever and this moment will be transmitted by the lever to the two opposed strings 13 and 14, increasing the tension on one string and lessening the tension on the other. Attention must be directed to the fact that lever 17 does not actually move. The lever merely senses the moment of the forces. This however is sufficient for the purpose of the present invention. It will be observed that this portion of the altimeter is substantially the device described hereinbefore in outlining the fundamental scientific principles of the invention.

Since the strings are vibrating in magnetic fields 15 and 15a formed by magnets 16 and 16a, a current is induced therein which alternates in accordance with the string vibrating frequency. This induced current which we may term the output frequency 23 and 23a of strings 13 and 14 is amplified in amplifiers 24 and 25. A portion of this amplified frequency is fed back to the strings in an oscillatory feedback circuit 26 which keeps the strings vibrating at their resonant frequencies, for the particular tension applied thereto in accordance with conventional circuitry such as described in the P. J. Holmes, U.S. Patent No. 2,959,965; the L. E. Dunbar et al., U.S. Patent No. 2,968,950; and the F. Rieber, U.S. Patent No. 2,513,678. The other portion of the output of amplifiers 24 and 25 is fed to frequency multipliers 27 and 28 to increase resolution. In the frequency selector stage 31 there will be provided a series of frequencies to indicate altitude, each frequency indicating a certain altitude over the preceding frequency, the frequency multiplier 27 and multiplier 28 will increase the frequencies from amplifiers 24 and 25 so that the output compared in the frequency selector stage 31 is more readily identifiable with one of the set frequencies in that stage. From the frequency multiplier stage, 27 and 28, the outputs are passed to a mixer 29. Here one frequency is added and subtracted to and from the other. And a filter 30 which provides only the difference between the frequencies is the next stage.

Up to this stage, the following operations have been performed;

(1) Change in string frequencies $$f_0 + Df;\ f_0 - Df$$

(2) Amplification $$(f_0 + Df);\ (f_0 - Df)$$

(3) Harmonic multiplication $$n(f_0+Df); \ n(f_0-Df)$$

(4) Addition and subtraction $$nDf_{s_1}+nDf_{s_2}; \ nDf_{s_1}-nDf_{s_2}$$

(5) Filter $$nDf_{s_1}-nDf_{s_2}$$

The output 30a from filter 30 can now be compared with known frequencies 31a, for given altitudes, i.e., $f_a$; $f_b$; $f_c$ ... $f_n$. These given frequencies are associated with frequency selector 31.

The rough altitude can now be read as shown by reading dial 31b. This only gives the altitude to the nearest lower comparable known frequency.

As resistors having a very high accuracy are commercially available, it is possible to balance out the difference between the transducer frequency and the reference frequency. For example, fifteen different reference frequencies corresponding to each 10,000 feet levels from sea level to 150,000 feet may be provided, the difference frequency with relation to the transducer or vibrating element section 10, may be compared to these reference frequencies $f_a$, $f_b$, $f_c$ etc. This comparison is repeated in a comparison mixer 32. Logical switching circuitry is provided to switch the proper reference frequency into the comparison mixer 32. The difference between the transducer frequency and reference frequency is the frequency output of comparison mixer 32 and filter 33. Within each 10,000 feet range, the transducer is used as the detector in an analog force feedback system. The difference frequency coming out of the comparison mixer 32 and filter 33 is converted into voltage by means of a discriminator 34. This voltage provides the input to a high gain D.C. amplifier 35. From D.C. amplifier 35, a servo loop 36 is provided which acts to control torque coils 37 in such a manner that a zero difference frequency is maintained between the transducer and the nearest lower reference frequency. Along servo loop 36 are a series of highly precise scaling resistors 38, $R_1$, $R_2$, $R_3$ ... $R_n$. Each of these resistors is associated with a particular reference level. The output voltage of the scaling resistors is used to drive a fine scale drum, tape indicator or similar device. Furthermore, simple display means 50 are provided so that only the scale or indicator for one resistor will appear for each reference frequency, i.e., the scale or indicator designed for that frequency.

It is also possible to use a digital computer in the control loop making the device completely digital. A digital display useful in this connection has been invented by the present applicant and is explained in U.S. patent application Serial No. 851,872, filed November 9, 1959 entitled "Alpha-Numerical Display Means."

Likewise, it is possible to make an altimeter which is completely analog in operation. In this type of device, frequency selector 31 and the comparison mixer 32 are eliminated. The basic pressure transducer is used over its full range in conjunction with conventional analog systems by using it as a detector in a closed loop feedback system. In this case, the torque coils 37 are used to null the system. The analog output is the current through the torque coil. This current passes through a scaling resistor to supply a reference signal voltage to a servo-motor which would drive a calibrated tape or dial. The overall accuracy of such a system is of course inferior to that shown in detail in FIGURE 2, or to an entirely digital system using the Alpha-Numerical Display Means hereinbefore mentioned.

The instrument depicted in FIGURE 2 however, is useful only over a certain altitude range. This is because of the tremendous difference in pressure which exists between sea level and an altitude of 150,000 feet. For example, the pressure at 150,000 feet is in the order of $2\times10^{-2}$ p.s.i. and the sea level pressure is approximately 15 p.s.i. The large ratio of sea level to high altitude pressure creates the need for a double sensing system.

Since, the atmosphere pressure areas 19 and 20 act at opposed ends of lever 17 at points 21 and 22, sufficient change in tension to realize a measurable change in frequency can be obtained at extreme altitudes by increasing the moment arm, i.e., by extending points 21 and 22 outwards along lever arms 17a and 17b. Since it is obviously not only inconvenient to move the pressure points, or the pressure areas 19 and 20, but such back and forth movement would certainly result in inaccuracies inherent in a system having moving parts, a second set of atmosphere pressure area pistons 39 and 40 are provided in a further embodiment shown in FIGURE 3.

Figure 3:
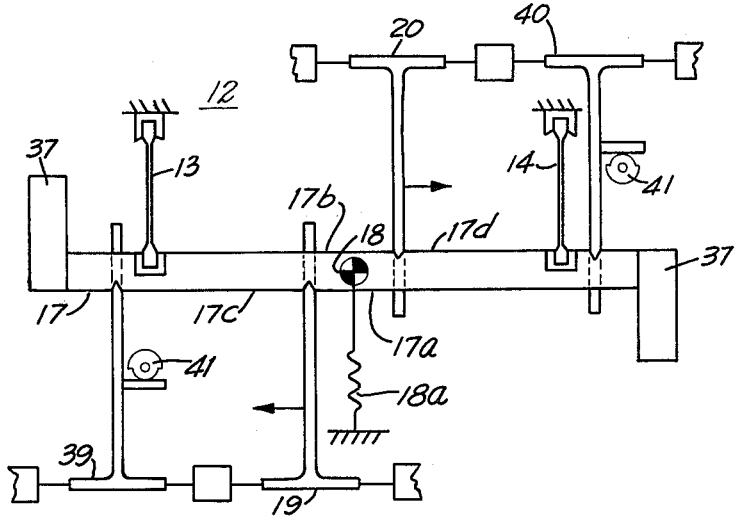
FIGURE 3 depicts an altimeter similar to the one shown in FIGURE 1, but adapted to give great accuracy at high and low altitudes.
Figure 4:
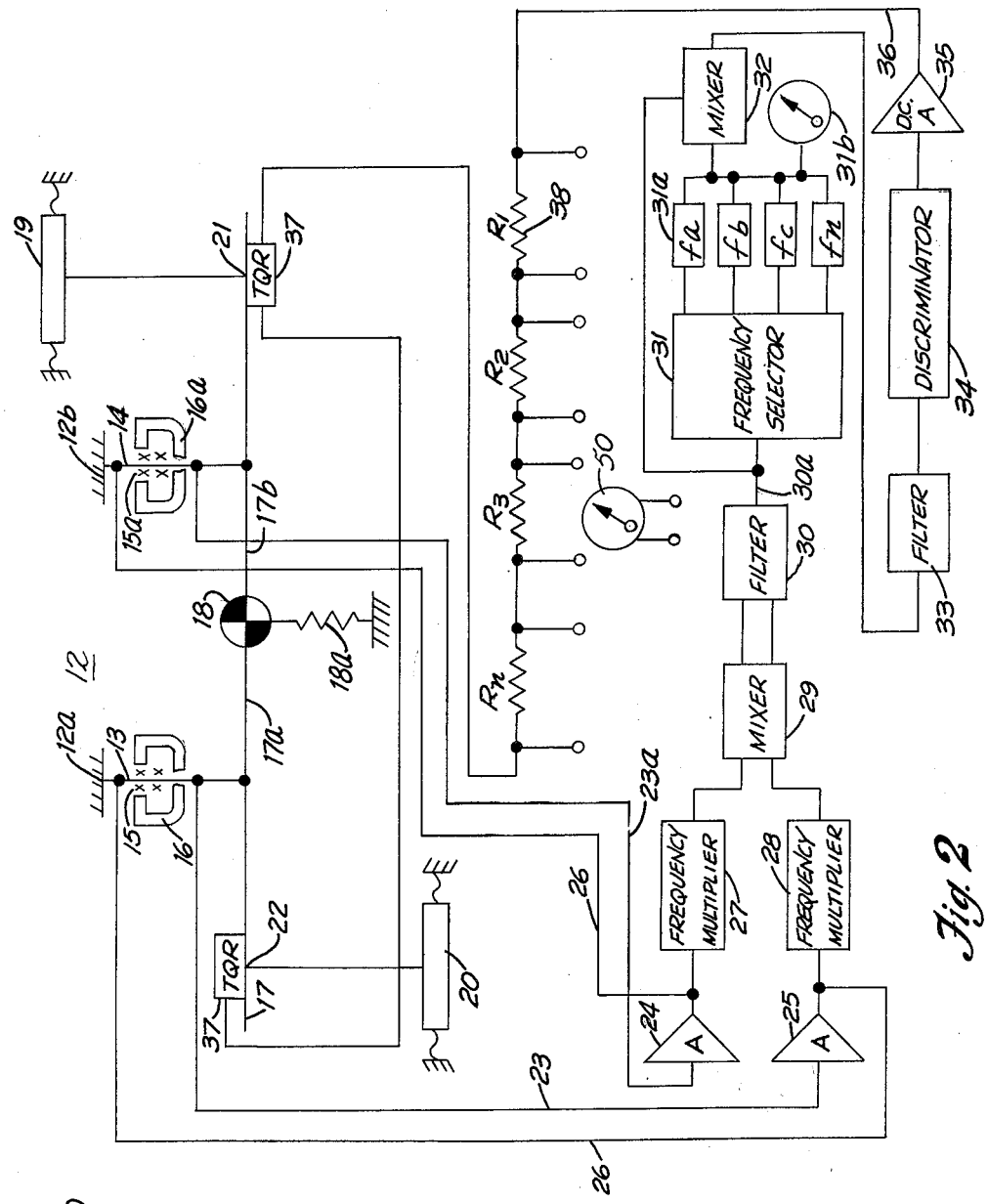
FIGURE 4 depicts another type of vibrating element useful with the present invention.

The device contemplated for high and low altitudes is shown in FIGURE 3 and comprises generally, vibrating strings 13 and 14 at opposed ends of lever 17. A pair of opposed atmosphere pressure areas or pistons 19 and 20 are relatively near the virtual fulcrum or midpoint of lever 17 whereas a pair of high altitude opposed atmosphere pressure areas 39 and 40 are located at some distance from the fulcrum, or, lever arms 17a and 17b between low altitude pistons 19 and 20 and the virtual fulcrum are substantially smaller than lever arms 17c and 17d between high altitude pistons 39 and 40 and the virtual fulcrum. The torque coil 37 must be so disposed as to be responsive and in a position to oppose the force of either set of pistons. In FIGURE 3, the pistons are shown loading the lever in a pushing mode. It is possible, and may be desirable in some cases to change these loading arrangements to a tension load. However, this is purely a matter of design. The high pressure low altitude pistons 19 and 20 are permanently loaded onto the lever, while the low pressure high altitude pistons are provided with unloading means 41 to unload them from the lever when a certain pressure is reached. The unloading means may comprise a simple stop, or may include a sector gear arrangement. Additional control is accomplished by varying the ratio of the areas of the sensing pistons. As the lower altitudes are approached, the torques created by the pistons with larger distance arms becomes very large, and, the unloading must be set at a convenient reference point so that false indications of altitude are not given immediately after the unloading. The pistons that are close to the fulcrum, 19 and 20 will have a negligible effect on the torques at high altitudes and can therefore be left in contact with the lever at all times.

The invention herein contemplated has been described with reference to vibrating strings. It is also possible to use a "Digital Force Transducer" such as described in my co-pending application. Serial No. 810,830 filed May 4, 1959. In general, this transducer includes a torsional vibrating disc head and shaft whose resonant frequency characteristics are varied by a change in tension applied to a pair of strings rigidly attached to the periphery of the disc head. In one form, this embodiment has a shaft 43 rigidly affixed to a base 42. At the end of the shaft 43 is a torsional vibrating disc head 44. Affixed to opposed points on a diameter of the disc 44 are strings 45a and 45b which are affixed to opposing base 42a so that the strings are under tension. Upon any small angle of twist of disc 44, a tangential pair of restoring forces are set up by tension in the strings 45a and 45b. Instead of a cylindrical shaft 43 and disc 44, it is also possible as shown in FIGURE 4a to use a shaft 43a fastened to base 42c and terminating in an outwardly extending flat torsional vibrating flat head 44a, the principal axis of the flat head being in the same plane, but at right angles to the longitudinal axis of the elongated shaft 43a. Strings 45a and 45b are disposed at opposed ends of the flat head 44a. The disposition of this embodiment in connection with the barometric pressure transducer is the same as the disposition of the strings as shown in the drawing. The calculations and formulas given herein, may be readily applied to the disc type of transducer.

For the purpose of giving those skilled in the art a better understanding of the invention, the following illustrative example is given:

EXAMPLE

Design of an Altimeter

Since the relationship between barometric pressure and altitude is not completely static but changes with local weather, an altimeter can only be designed based upon a model atmosphere. For the present purpose, the model atmosphere of the Air Research Development Command, 1956 is used. Based upon much detailed analysis and experience with the basic type of device herein described, it can be stated that the overall stability of the tension as a function of the product of the sum and difference frequencies of the two individual transducers can be made stable to better than one part in 100,000. For the present purpose, it can conservatively be assumed that the stability is somewhat better than 1 part in 20,000. This means that for the overall pressure transducer to have a stability and accuracy of 1 part in 10,000 which is the scale between reference frequencies, force inputs, from sources other than the pressure must not affect the output frequency by more than 1/20,000 of the force applied by the full scale pressure. Within the limitations imposed by this basic stability criteria, the resolution at the output can be increased indefinitely, without loss of accuracy by use of frequency multipliers.

If the full range of the instrument corresponds to a maximum frequency change of 100 c.p.s., then the maximum error, due to stability would be 1/10,000 or 100, or .01 c.p.s. at full scale. At any load below this down to 0 pressure and the corresponding frequency, the error will be no greater and indeed, will be generally less. On this basis, the stable threshold value, and smallest resolvable increment, would be .01 cycle per second. For the purpose of either read-out or control instrumentation, a much higher frequency gradient is preferred, i.e., it may be desirable to use a frequency of 1 c.p.s. to represent the minimum value; maximum value to be represented by 10,000 c.p.s. All that is required is an electronic multiplier circuit with a frequency multiplication of 100. The .01 c.p.s. now appears at the output of the frequency multiplier as 1 c.p.s.

Based upon the foregoing, an altitude error and corresponding pressure change error is selected that is acceptable at an altitude of 150,000 feet. The instrument is thus designed so that this pressure change will cause a frequency change of .01 c.p.s. at the immediate output of the transducer or 1 c.p.s. after the multiplier stage. Since, according to the model atmosphere, the pressure gradient at this altitude is $0.609 \times 10^{-6}$ p.s.i. per foot or $0.609^{-4}$ p.s.i. per hundred feet the piston area and lever proportions are so scaled that this change of pressure applies a force to the transducer sufficient to cause a change of at least 0.01 c.p.s. The maximum pressure to which the transducer can now operate is then limited to 10,000 times this pressure or 0.609 p.s.i. This corresponds to an altitude of slightly over 70,000 feet.

The pressure gradient increases rapidly as the altitude is decreased, so that the altitude error at the 70,000 foot level is a small part of the 100 feet assumed at the 150,000 foot level. For the lower altitude high pressure range, a maximum pressure of approximately 14.7 p.s.i. must be measured. Using the same stability and maximum stress and tension figures, the resolution and accuracy is equal to $14.7 \times 10^{-4}$ p.s.i. per foot. The error, at the altitude, would be less than 60 feet on the high pressure scale.

Based upon the fundamentals hereinbefore given, it is now possible to calculate a transducer for an altimeter useful at high and low altitudes as depicted in FIGURE 3, with reference to the schematic diagram of FIGURE 1.

Assume that a nearly perfect vacuum exists within the housing 12 of the unit. Thus, the pressure inside is zero. Or, pressure outside minus pressure inside=$DP=P$; and, the pressure on the pistons 19 and 20 of equal effective area A is the actual ambient pressure. The force acting on each piston is PA and the two forces taken together form a couple about the pivotal point equal in magnitude to 2 PA$r'$. This clockwise moment is counterbalanced by the couple formed by the tension changes in each of the vibrating string 2 $DTr$. Therefore:

$$2\ PAr' = 2\ DTr$$
$$DT = PA(r'/r)$$

The equation for a frequency change for a double string is $Df = k/f_0 \times DT$ (the equation for a single string frequency change being $K/2f_0 \times DT$)
Therefore, $$Df = k/f_0 \times DT = k/f_0 \times PA \times (r'/r)$$

Where
$k$ is the constant $$\frac{1}{4mL} = \frac{1}{4pA_sL^2}$$

$p$ is the pressure in pounds/in.$^2$
$A_s$ is the area of the piston in inches$^2$
$f_0$ is the base frequency in cycles/sec.
$r'$ is the distance from the fulcrum of the pistons
$r$ is the distance from the fulcrum of the strings For the upper range of the instrument (altitudes of 150,000 feet to approximately 70,000 feet) the instrument is to be designed to detect a change in altitude of 100 feet. The minimum pressure differential which occurs at 150,000 feet for 100 feet, i.e., DP/DH for 100 feet at 150,000 feet is $0.609 \times 10^{-4}$ p.s.i.

This pressure increment is taken from a plot of the 1956 Air Research Development Command model atmosphere as hereinbefore explained.

The frequency change corresponding to this altitude change is considered to be the threshold value for the instrument, and as mentioned is chosen to be greater than 0.01 c.p.s. Selecting an operating base frequency $f_0$, and a stress level, determines the dimensions of the string. It is obviously advantageous to select as low an operating stress as practical to maintain good stability. $f_0$ should be somewhere between about 2,000 c.p.s. and about 4,000 c.p.s. Let us choose $f_0 = 3,000$ c.p.s.

The equation for the length L of a string hereinbefore given is:

$$L = 1/2f_0 \times \sqrt{S_0/p}$$

For reasons of stability, Beryllium-Copper with a mass density of $7.7 \times 10^{-4}$ lb. sec.$^2$/in.$^4$ is selected. The operational stress depends on the string and may be anywhere between 10,000 and 30,000 p.s.i., even lower or higher in some cases. Limiting the operating stress, $S_0$, to 20,000 p.s.i. gives a length of $$L = 1/2(3000) \times \sqrt{20,000/(7.7 \times 10^{-4})} = 0.850\ \text{inch}$$

The bias tension, $T_s$, is a design parameter that is conveniently chosen to match the requirements of the string dimensions for minimization of column effects. Consequently, the string must be slender enough to act as a fiber. The diameter of the string can be mathematically calculated based on the formula for the slenderness ratio of the string. However, since the material from which the string is to be constructed is commercially available in certain sizes, it is more practical to pick out logical available sizes and fitting the size into the calculations. In this way, a size of .01 inch diameter may readily be selected.

We can now calculate the bias tension $T_s$ which equals $S_0 A_s$.

$$T_s = 20,000 \times (0.01/2)^2 \times \pi = 1.57\ \text{pounds}$$

The sensitivity G of a string is the ratio of the frequency change to the tension change.

$$G = Df/DT = (Df_1 + Df_2)/DT = k/f_0 = \frac{1}{f_0 \times (4pA_sL^2)}$$

The sensitivity G of the string can now be determined as follows:

$$G = \frac{k}{f_0} = \frac{4mL}{f_0} = \frac{4pA_sL^2}{f_0} = \frac{4 \times (7.7 \times 10^{-4}) \times \pi(.01/2)^2 \times (.85^2)}{3000}$$

$$= \frac{5.73 \times 10^{-6} (1/\text{pounds-sec.}^2)}{3000 \text{ (c.p.s.)}} = 1910 \ (1/\text{pounds-second})$$

Having now selected a string it is necessary to select the piston area and the ratio of the arms $r'/r$. The high value for the sensitivity means that for a particular range, or ratio of maximum frequency change to threshold value, the so called threshold value can be increased, thereby increasing accuracy. To make an effective selection, a curve is plotted as depicted in FIGURE 10 showing the various parameters involved;

$$Df(\text{threshold}) = GDP(\text{threshold}) \times A(r'/r)$$
$$= 1910 \times .610 \times 10^{-4} \times A(r'/r)$$

Figure 10:
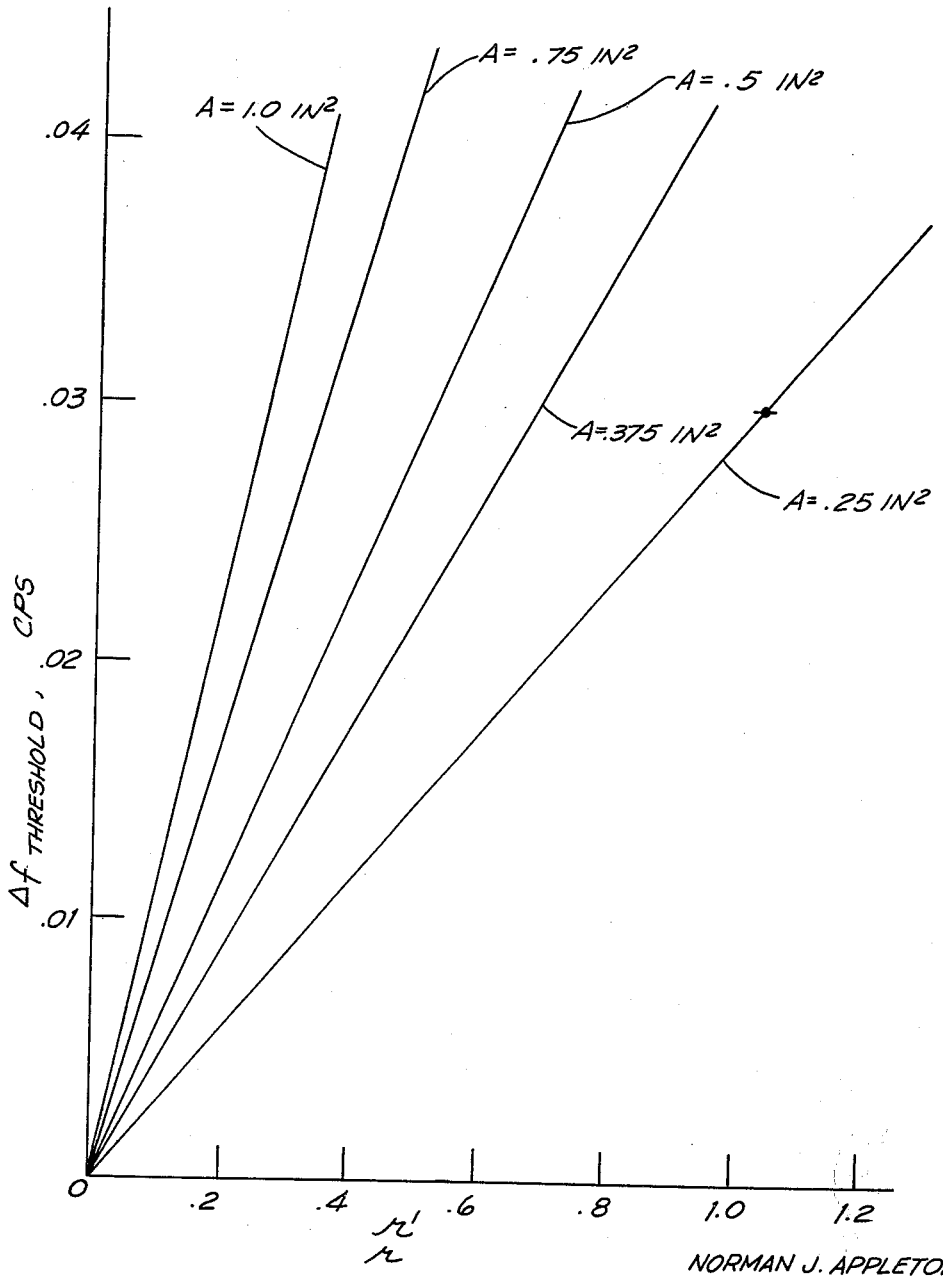
FIGURE 10 is a graph useful in designing an altimeter according to the invention being contemplated, use being made of FIGURE 10 in the example contained herein.

From the plot of the various areas as depicted in FIGURE 10, the line of .25 inch.²

(diameter = .56) and a ratio of $r'/r$ of 1.03 gives a $Df$ of .03 c.p.s.

If the range of the transducer is held at 10,000/1

$$Df \text{ max} = 10^4 \times .03 = 300 \text{ c.p.s.}$$

therefore $$DT \text{ max} = Df \text{ max}/G = \frac{300 \frac{1}{\text{sec.}}}{1910 \frac{1}{\text{sec.-pound}}} = .157 \text{ pound}$$

$$S \text{ max} = S_0 + \frac{DT \text{ max}}{A_s}$$

$$= 20{,}000 + \frac{.157}{.785 \times 10^{-4}} = 22{,}000 \text{ p.s.i.}$$

The ratio of $DS/S_0$ at maximum (2,000/20,000) is 0.10.

For the present instrument, the $Df$ between the floor and ceiling of the high altitude range of 300 c.p.s. has been selected. In practice this $Df$ should be between about 100 c.p.s. to about 500 c.p.s.

For the high altitude portion of the instrument, we now have:

| | | |
|---|---|---|
| String length | inches | 0.850 |
| String dia. | do | 0.01 |
| High altitude piston area | inch² | 0.25 |
| $r'/r$ | | 1.03 |
| $Df$ maximum | c.p.s. | 300 |
| Threshold $f$ | c.p.s. | 0.03 |

The upper pressure range covers a total pressure increment of $10^4 \times 0.610 \times 10^{-4}$ p.s.i. or 0.610 p.s.i. Therefore, the pressure at the upper altitude of the lower range is:

$$P \ 150{,}000 \text{ feet plus } DP \text{ upper range}$$
$$= 2.04 \times 10^{-2} + .610 = .63 \text{ p.s.i.}$$

The altitude corresponding to this pressure according to our model atmosphere is 70,500 feet.

At $H = 70{,}500$ feet, $dP/dH = 2.67 \times 10^{-5}$ p.s.i./ft.

At lower altitudes the piston having area A is to be unloaded from the lever and a second pair of areas $A_2$ located at a distance of $r''$ from the pivot will load the strings by means of the lever.

Since $$G = k/f_0$$

$$Df = \frac{k}{f_0} \times DPA_2 \times \frac{r''}{r} = GDPA_2\frac{r''}{r}$$

$$A_2(r''/r) = \frac{Df}{GDP}$$

and

| | | |
|---|---|---|
| Pressure at zero is | p.s.i. | 14.7 |
| Pressure at 70,500 feet is | p.s.i. | 0.63 |
| DP maximum is | p.s.i. | 14.07 |
| and $Df$ maximum is | c.p.s. | 300 |
| also G is | | 1910 | therefore $$A_2(r''/r) = \frac{Df}{GDP} = \frac{300}{1910 \times 14.07} = 0.01116 \text{ in.}^2$$

But, since A for high altitudes is .25 in.², using the same .25 in.² for $A_2$, $$.25(r''/r) = 0.1116; \ r''/r = 0.0446$$

Since the threshold frequency is 0.03 c.p.s., the pressure change corresponding to this frequency is:

$$DP = \frac{Df}{GA_2(r''/r)} = \frac{0.03}{0.1116 \times 1910} = 1.41 \times 10^{-3} \text{ p.s.i.}$$

Now $dP/dH$ at $H = 70{,}500$ feet $= 2.67 \times 10^{-5}$ p.s.i./ft. Therefore DH corresponding to a $Df$ of 0.03 c.p.s. is $$\frac{1.41 \times 10^{-3}}{2.67 \times 10^{-5}} = 53 \text{ feet}$$

In the selection of a string, some study may be required to select one having a proper slenderness ratio. In the case of a string having a circular cross-section, the slenderness ratio is $$S.R. = 4 \times \text{length divided by the string diameter}$$

the slenderness ratio for the purpose of the present invention should preferably be greater than 100. In the foregoing example, $S.R. = 340$.

It is to be observed from the foregoing example that the present invention provides the design parameters for an altimeter for high and low altitudes. The high altitude portion comprises in combination, a lever of the first class; a pair of vibrating strings disposed at opposed ends of said lever of a length L where $$L = 1/2f_0 \times \sqrt{S_0/p}$$

where $f_0$ is a selected operable fundamental frequency, e.g., between about 2,000 c.p.s. and 4,000 c.p.s.

$S_0$ is the stress on the strings at the fundamental frequency in p.s.i.

$p$ is the density in pounds × sec.² divided by in.⁴ of a string of a cross-sectional area $A_s$ in inches determined by the slenderness ratio to minimize column effect;

a bias tension $T_s$ applied to each string by tension means on the lever located at the centerpoint between said strings determined by the equation $$T_s = S_0 A_s$$

and a pair of high altitude pistons loading said lever at opposed sides thereof, each piston having an atmosphere pressure area size, and located on the lever at a distance from said centerpoint as determined by the formula $$A(r'/r) = \frac{Df}{G \times DP}$$

where

A is the atmosphere pressure area size of the piston in in.²

$r'$ is the distance that each piston is located from said centerpoint in inches $r$ is ½ the distance between strings in inches $Df$ is the selected frequency difference between the ceiling and floor of the selected high altitude range, e.g., between about 100 c.p.s. and 500 c.p.s.

$$G \text{ is } \frac{1}{f_0 \times (4pA_sL^2)}$$

DP is the difference in pressure between the ceiling and floor of the selected high altitude range of a selected model atmosphere, and the low altitude portion of the instrument comprises low altitude pistons having an atmosphere pressure area size $A_2$ and located on the lever at a distance from said centerpoint as determined by the formula $$A_2(r''/r) = Df \times G \times DP'$$

where $r''$ is the distance that each low altitude piston is located from said centerpoint in inches $DP'$ is the model atmosphere difference in pressure between zero feet altitude and the high altitude floor $Df$ is the change in frequency for a difference of pressure $DP'$ Unloading means are provided to unload the low altitude pistons from the lever at selected altitudes.

The present invention is a continuation-in-part of U.S. patent application Serial No. 810,830, filed May 4, 1959 entitled "Digital Force Transducer" and U.S. patent application Serial No. 851,872 filed November 9, 1959, now Patent No. 3,020,531, entitled "Alpha-Numerical Display Means."

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In an altimeter and casing for a desired altitude range, in combination, a lever of the first class; a pair of strings designed to vibrate connected to opposite ends of said lever and casing, said strings being of a length L in inches where $$L = \frac{1}{2f_0} \times \sqrt{S_0/p}$$

where $f_0$ is a selected operable fundamental frequency $S_0$ is the stress on the strings at the fundamental frequency in p.s.i.

$p$ is the density in pounds $\times$ seconds$^2$ divided by inches$^4$ of a string of a cross-sectional area $A_s$ in inches$^2$ determined by the slenderness ratio to minimize column effect;

a bias tension $T_s$ applied to each string by tension means on the lever located at the centerpoint between said strings, determined by the equation $$T_s = S_0 A_s$$

$A_s$ being the cross-sectional area of the string in inches$^2$ and, a pair of pistons including an atmosphere pressure area loading said lever on opposite sides thereof and on opposite sides of the centerpoint thereof, the size of the atmosphere pressure area, and the location of the pistons on the lever being determined by the formula $$A(r'/r) \frac{Df}{G \times DP}$$

where

A is the atmosphere pressure area size of the piston in inches$^2$ $r'$ is the distance that each piston is located from said centerpoint in inches $r$ is ½ the distance between strings in inches $Df$ is the selected frequency difference between the ceiling and floor of the selected altitude range $$G \text{ is } \frac{1}{f_0 \times (4pA_sL^2)}$$

DP is the difference in pressure between the ceiling and floor of the selected altitude range of a selected model atmosphere.

2. In an altimeter and casing for high and low altitudes, in combination, a lever of the first class; a pair of strings designed to vibrate connected to opposite ends of said lever and casing, said strings being of a length L in inches where $$L = \frac{1}{2f_0} \times \sqrt{S_0/p}$$

where $f_0$ is a selected operable fundamental frequency $S_0$ is the stress on the strings at the fundamental frequency in p.s.i.

$p$ is the density in pounds $\times$ seconds$^2$ divided by inches$^4$ of a string of a cross-sectional area $A_s$ in inches$^2$ determined by the slenderness ratio to minimize column effect;

a bias tension $T_s$ applied to each string by tension means on the lever located at the centerpoint between said strings, determined by the equation $$T_s = S_0 A_s$$

$A_s$ being the cross-sectional area of the string in inches$^2$ a pair of high altitude pistons including an atmosphere pressure area loading said lever on opposite sides thereof, and on opposite sides of the centerpoint thereof, the size of the atmosphere pressure area, and the location of the pistons on the lever being determined by the formula $$A(r'/r) = \frac{Df}{G \times DP}$$

where

A is the atmosphere pressure area size of the piston in inches$^2$ $r'$ is the distance that each piston is located from said centerpoint in inches $r$ is ½ the distance between strings in inches $Df$ is the selected difference in frequency between the ceiling and floor of the selected high altitude range $$G \text{ is } \frac{1}{f_0 \times (4pA_sL^2)}$$

DP is the difference in pressure between the ceiling and floor of the selected high altitude range of a selected model atmosphere;

a pair of low altitude pistons including an altitude pressure area, loading said lever on opposite sides thereof and on opposite sides of the centerpoint thereof, the size of the atmosphere pressure area $A_2$ and the location of the pistons on the lever being determined by the formula $$A_2(r''/r) = Df \times G \times DP'$$

where $r''$ is the distance that each low altitude piston is located from said centerpoint in inches $DP'$ is the model atmosphere difference in pressure between zero feet altitude and the high altitude floor $Df$ is the change in frequency for a difference of pressure $DP'$ and, unloading means to unload the low altitude pistons from the lever at a selected altitude.

3. In an altimeter and casing for high and low altitudes, in combination, a lever of the first class; a pair of strings designed to vibrate connected to opposite ends of said lever and casing, said strings being of a length L in inches which $$L = \frac{1}{2f_0} \times \sqrt{S_0/p}$$

where $f_0$ is a selected fundamental frequency of between about 2000 c.p.s. to about 4000 c.p.s.
$S_0$ is the stress on the strings at the fundamental frequency in p.s.i. somewhere of the order of between some 10,000 and some 30,000 p.s.i.
$p$ is the density in pounds $\times$ seconds$^2$ divided by inches$^4$ of a string of a cross-sectional area $A_s$ in inches$^2$ determined by the slenderness ratio to minimize column effect;

a bias tension $T_s$ applied to each string by tension means on the lever located at the centerpoint between said strings, determined by the equation $$T_s = S_0 A_s$$

$A_s$ being the cross-sectional area of the string in inches$^2$
a pair of high altitude pistons including an atmosphere pressure area loading said lever on opposite sides thereof, and on opposite sides of the centerpoint thereof, the size of the atmosphere pressure area, and the location of the pistons on the lever being determined by the formula centerpoint as determined by the formula $$A(r'/r) = \frac{Df}{G \times DP}$$

where

A is the atmosphere pressure area size of the piston in inches$^2$
$r'$ is the distance that each piston is located from said centerpoint in inches
$r$ is ½ the distance between strings in inches
$Df$ is the selected difference in frequency between the ceiling and floor of the selected high altitude range of between about 100 c.p.s. to about 500 c.p.s.

$$G \text{ is } \frac{1}{f_0 \times (4pA_sL^2)}$$

DP is the difference in pressure between the ceiling and floor of the selected high altitude range of a selected model atmosphere;

a pair of low altitude pistons including an altitude pressure area, loading said lever on opposite sides thereof and on opposite sides of the centerpoint thereof, the size of the atmosphere pressure area $A_2$ and the location of the pistons on the lever being determined by the formula $$A_2(r''/r) = Df \times G \times DP'$$

where $r''$ is the distance that each low altitude piston is located from said centerpoint in inches
DP' is the model atmosphere difference in pressure between zero feet altitude and the high altitude floor
$Df$ is the change in frequency for a difference of pressure DP' and, unloading means to unload the low altitude pistons from the lever at a selected altitude.

4. An atmospheric pressure transducer, comprising in combination,
a housing;
identical elements designed to vibrate, disposed at opposite ends of said housing, one end of said elements being affixed to said housing;
magnet means at said opposite ends so disposed with respect to said elements that the vibration of said elements will induce an alternating current therein;
an oscillatory feedback circuit coupled to each element to maintain said elements vibrating;
a lever of the first class disposed between said elements and affixed thereto at the other end thereof;
tension means at the midpoint of said lever tending to load said elements equally thereby balancing said lever and creating a virtual fulcrum at said midpoint; and,
pistons including an atmosphere pressure area disposed so as to receive the atmospheric pressure outside said housing and transmit said pressure to the lever in said housing, said pistons being on opposite sides of said lever, equidistant from the midpoint thereof, disposed so as to form a pivotal couple about said virtual fulcrum, the atmosphere pressure area and loading of each piston being equal so that the two forces forming said couple taken together are equal in magnitude.

5. A device as claimed in claim 4, said identical elements being strings.

6. A device as claimed in claim 4, said housing being a vacuum housing.

7. A device as claimed in claim 4, said identical elements being torsional vibrating elements including a shaft at one end of said elements, a head on said shaft, and a pair of strings rigidly attached to the extremities of each head at the other end of said elements.

8. A device as claimed in claim 4, useful as an altimeter, including a mixer-filter coupled to said oscillatory feedback circuits into which is fed said alternating currents induced into said elements, said mixer-filter providing an electrical A.-C. output of a frequency which is a difference between the vibrating frequency of said elements; a selector providing a plurality of reference A.-C. frequencies corresponding to separate altitude heights into which is fed the A.-C. output of said mixer-filter to match said A.-C. output frequency from the mixer-filter with one of the selector A.-C. frequencies; and, display means responsive to said selector to display said selected A.-C. frequency as altitude.

9. A device as claimed in claim 8, the output of the mixer-filter being matched with the nearest lower selector frequency, including an analog circuit coupled to said selector converting frequency units into an electrical quantity and apportioning any difference between the matched frequencies as a fractional altitude reading intermediate the altitude corresponding to the matched reference frequency and the next higher frequency.

10. A device as claimed in claim 8, including a second set of pistons similar to said first set of pistons but spaced relatively close to said virtual fulcrum, said second set of pistons being designed for use at low altitudes; and, unloading means to unload said first set of pistons from the lever when subjected to a given atmospheric pressure.

References Cited in the file of this patent

UNITED STATES PATENTS

| | | |
|---|---|---|
| 2,557,817 | Dutton | June 19, 1951 |
| 2,627,033 | Jensen et al. | Jan. 27, 1953 |
| 2,968,943 | Statham | Jan. 24, 1961 |